Fig. 1.

R. R. BREWER.
PORTABLE HOUSE.
APPLICATION FILED OCT. 11, 1909.

974,233.

Patented Nov. 1, 1910.
6 SHEETS—SHEET 6.

Witnesses:
Chas. A. Baker
George G. Anderson

Inventor:
Robert R. Brewer
By Hugh N. Wagner
His Attorney.

UNITED STATES PATENT OFFICE.

ROBERT R. BREWER, OF ST. LOUIS, MISSOURI.

PORTABLE HOUSE.

974,233.

Specification of Letters Patent.   Patented Nov. 1, 1910.

Application filed October 11, 1909. Serial No. 522,055.

*To all whom it may concern:*

Be it known that I, ROBERT R. BREWER, a citizen of the United States, residing at the city of St. Louis, State of Missouri, have invented certain new and useful Improvements in Portable Houses, of which the following is a specification, reference being had therein to the accompanying drawings.

This invention relates to portable houses, especially to that class of houses suitable for use as temporary offices for architects, contractors, builders, etc., or their representatives, when it is necessary for them to have an office on the grounds where their work is under construction. It is, also, intended for use as a play-house for children, camping house, out-house for consumptives, etc., and for various other purposes.

The object of this invention is to provide a portable house in which the component parts are formed to fit together in accordance with the plans of the house, so that, when the material is shipped to the place where the house is to be erected, it is only necessary to assemble the parts without additional cutting and fitting of the material on the grounds.

Another aspect is found in the manner in which the parts are assembled and, also, in the mode of securing and retaining the parts in place.

This form of construction greatly reduces the cost for the reason that the parts can be milled by machinery and that they can be assembled without employing skilled labor.

In the drawings forming part of this specification, in which like numbers of reference denote like parts wherever they occur.

Each sill 1, upon which a side wall 2 is supported, is formed by nailing two boards together length-wise, one of said boards being preferably longer than the other so that each end of the long board will extend beyond an adjacent end of the short board and overlap an end of a similar long board which extends beyond an end of a short board forming part of a sill 3 under an end wall 4. The center sill 5, which extends preferably length-wise of the building, is, also, formed by nailing two boards together, one of said boards being long enough to overlap the bottom boards of the end sills 3 and the other said board being adapted to fit between said bottom boards of the end sills 3. The top board of said sill 5 rests upon the bottom board of the end sills 3 and each end of said top board of sill 5 lies in a space between the top boards of an end sill 3 so that when said sills 1, 3, and 5 are all fitted together as hereinabove described, the top surface of each sill is in the same plane. A floor of ordinary flooring-boards can be laid on said sills within the building or a cement, cinder, or other suitable floor can be provided if desired.

Each corner post 6 is inserted into an opening 7 in the top board of one of the sills and rests upon the bottom boards of an adjoining sill. Each intermediate post 8 is set in an opening 7 in the top board of the sill upon which the intermediate post rests. When a post 8 is located over an end of sill 5 said post 8 is inserted into an opening 7 in an end of the top board of said sill and rests on the bottom board of the sill adjacent said end.

Two adjacent faces of each corner post 6 are each provided with a groove 9 and each post 6 is so set at a corner of the building that one of said grooves occupies a position in a side wall 2 and the other said groove occupies a position in an end wall 4. A groove 10 is formed in each of two opposite faces of each intermediate post and, when said posts are set in place, each of said grooves lies in the plane of the wall in which the intermediate post is located. The grooves 9 in each corner post 6 extend the full length thereof. The grooves 10 in each intermediate post 8 extend from the bottom of the post to a point below the level of the eaves of the roof 11. At said point each groove 10 terminates in a slot 12 which extends from thereon to the top of said post 8.

Each post 13, which forms a part of a door-frame for a door 14, is provided with a groove 15 in one side thereof, and said groove extends from the bottom of said post to the top of the door, at which point the groove terminates in a slot 16 in the top of said post. The pieces 17, forming sides of the window-frames of the windows 18, are each formed with a groove 19 in one side and each end of each piece is slotted at 20. Each board 21 adjacent the top or the bottom of a window 18 and each board 21 adjacent the top of a door 14 is provided with a pair of boards 21ª, said board 21 being located between said pair of boards 21ª. Each pair of boards 21ª is of such thickness that together with the board 21 to which said pair is nailed, the thickness of the three boards is preferably equivalent to the thickness of the side pieces of the frame of the door, or window.

All uprights, door-frames, and window-frames are preferably of equal thickness so that, when the house is assembled, the inner surface of each upright, door-frame, and window-frame of each wall will be in the same plane with the others of the same wall on the inside of the building, whereby the building can be lined with any desirable material. The walls are formed preferably of ordinary planking 21, which are all cut to the proper length to fit in their respective places and are inserted in the above-mentioned grooves and slots in a manner to be hereinafter more fully described.

Figures 5, 6:
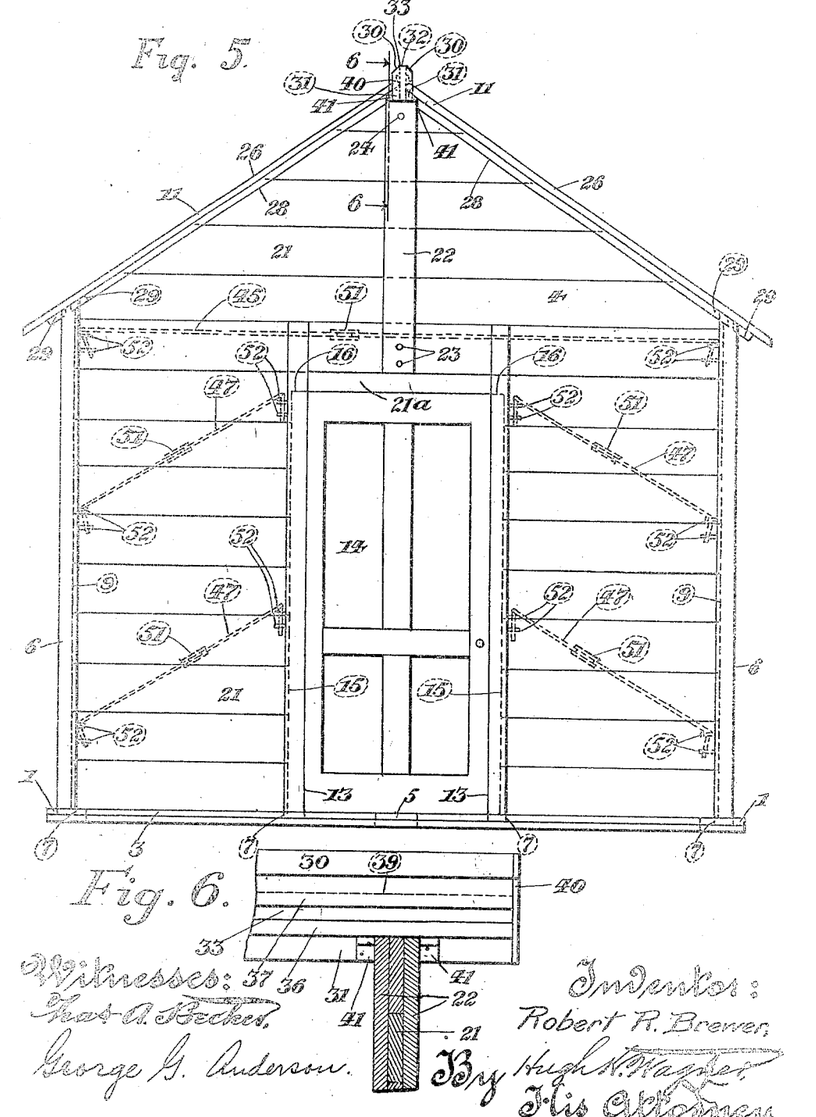
Fig. 6 is a sectional view on the line 6—6, Fig. 5.

When a door 14 is located in an end wall 4, as depicted in Fig. 5, the center post 8 is omitted entirely. Two boards 22 are fastened by the bolts 23 or other suitable means, to a board 21 above said door. One of said boards 22 is located on the outside of the end wall and the other said board 22 is located on the inside of said wall. The remaining boards above said board 21 are inserted between said boards 22. A bolt 24 secures the top of said boards 22 together.

The doors and windows are each hung on ordinary shutter-hinges 25, or other suitable means, and preferably swing into the interior of the building, but may be hung to swing outwardly if desired.

Each board 26, of which the roof 11 is constructed, is provided with a rabbeted edge each of which is adapted to fit the rabbeted edge of an adjacent board of the roof. A groove 27 is formed in the portion of each rabbeted edge which underlies an adjoining rabbeted edge. Water, which enters the cracks between the roof-boards 26, flows into grooves 27 and is drained from the roof thereby, thus preventing leakage through said cracks. The end boards of the roof are each provided with one rabbeted edge which fits the rabbeted edge of an adjoining board and the exposed edge of each end board is finished preferably square. A strip of wood 28 is nailed to each end board of the roof and is adapted to hold the end board in place by an end of said strip resting against the top of a corner post 6, said strip 28, also, to cover the ends of the boards 21 of an end wall beneath said end board. A pair of cleats 29 is nailed to each intermediate roof-board 26 and, when said board is laid in place, the top board of a side wall fits between said cleats and holds each intermediate board in place.

Figures 8, 9:
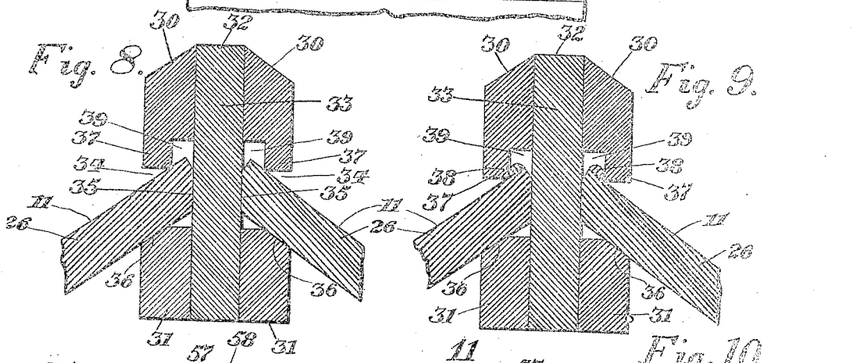
Fig. 8 is a sectional view on the line 8—8, Fig. 2.
Fig. 9 is a sectional view through an alternative form of ridge-pole.

The pieces 30 and the pieces 31, all of which can be cut from a single board having a pair of rabbeted edges, are nailed to the center board 32 and form therewith the ridge-pole 33, as depicted in Figs. 8 and 9. Each groove 34 between a piece 30 and a piece 31 forms a pocket for the upper ends of the roof-boards 26. The upper end of each roof-board 26 is provided with a bevel 35, which fits against a side face of the center board 32 when said roof-board is in the plane of the portion of the roof in which it lies. Each piece 31 has a beveled edge at 36 upon which the roof-boards 26 are adapted to rest. The projection 37 on each piece 30 prevents the roof-boards 26 from being raised out of groove 34. To provide additional means for securing the roof-boards 26 in groove 34, a strip of wood, or metal 38 can be attached to the top of each roof-board, and, when the ends of said roof-boards are inserted into groove 34, each strip 38 will enter groove 39 between projection 37 and the center board 32, and said strip will be held in said groove 39 by said projection. Said strip 38 is preferably semi-circular in cross-section, as shown in Fig. 9, but a strip having any other desirable form of cross-section can be advantageously used for the same purpose. Each end of said ridge-pole 33 is covered by a board 40, which is nailed thereto and prevents the roof-boards 26 from being slid out of an end of a groove 34. Said ridge-pole is prevented from longitudinal motion by the cleats 41, each of which is attached to the ridge-pole and is located adjacent a center pole 8, or a board 22, as shown in Fig. 9.

Figure 7:
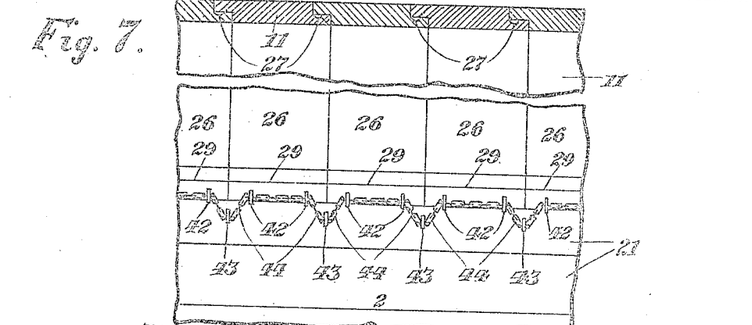
Fig. 7 is a sectional view on the line 7—7, Fig. 4.

Each cleat 29 on the inside of the building is provided with a screw-eye 42, or a plurality of such screw-eyes, or the like. A plurality of screw-eyes 43 are secured to each side wall 2 and each is located preferably between adjacent screw-eyes 42. The roof-boards on each side of the roof are fastened to a side wall 1 by a chain 44, which is laced, as shown in Fig. 7, through the screw-eyes 42 and the screw-eyes 43 and is attached at each end in any suitable manner to a corner post 6. The roof-boards 26 are, thus, secured firmly to each side wall 2 and, also, are held in place by the cleats 29.

Figure 1:
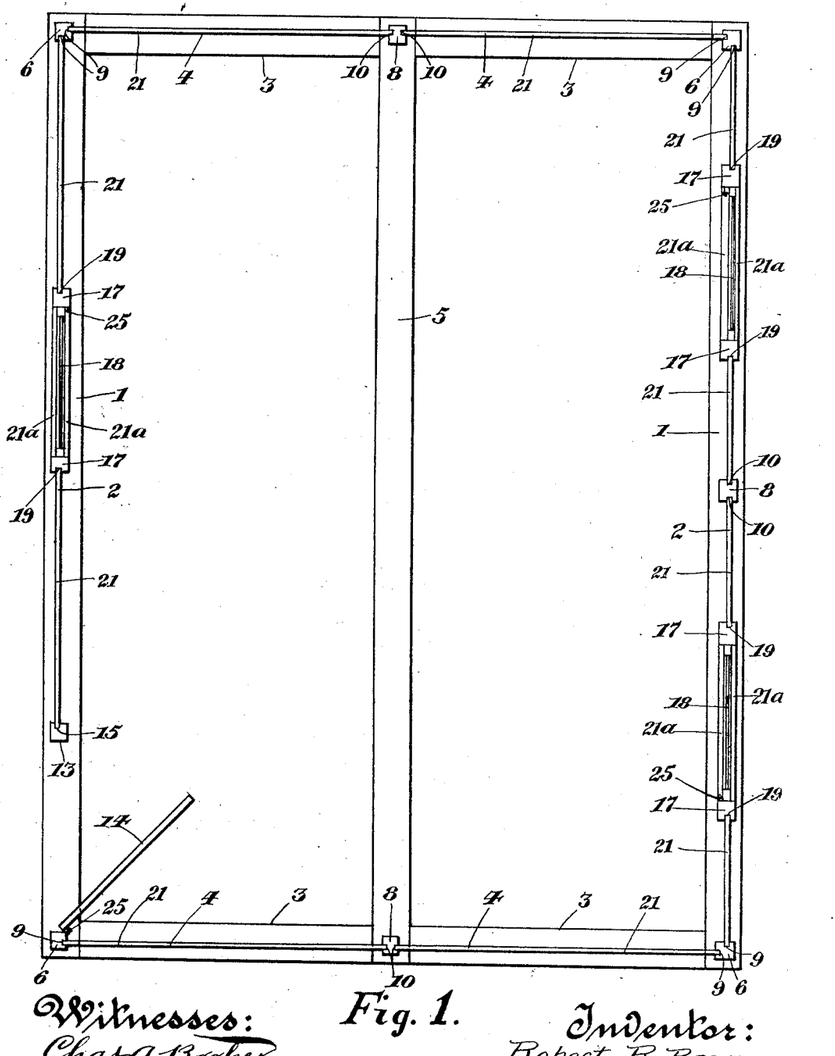
Figure 1 is a plan view.
Figure 2:
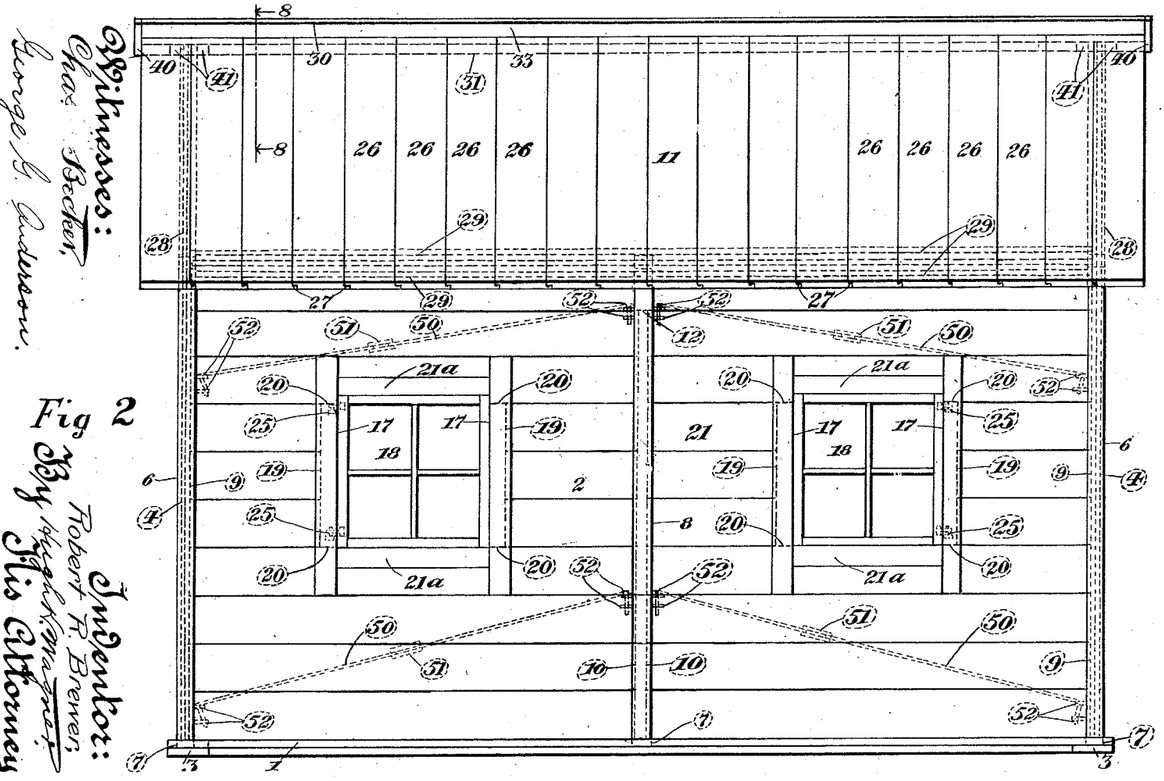
Figs. 2 and 3 are side elevations.
Figure 3:
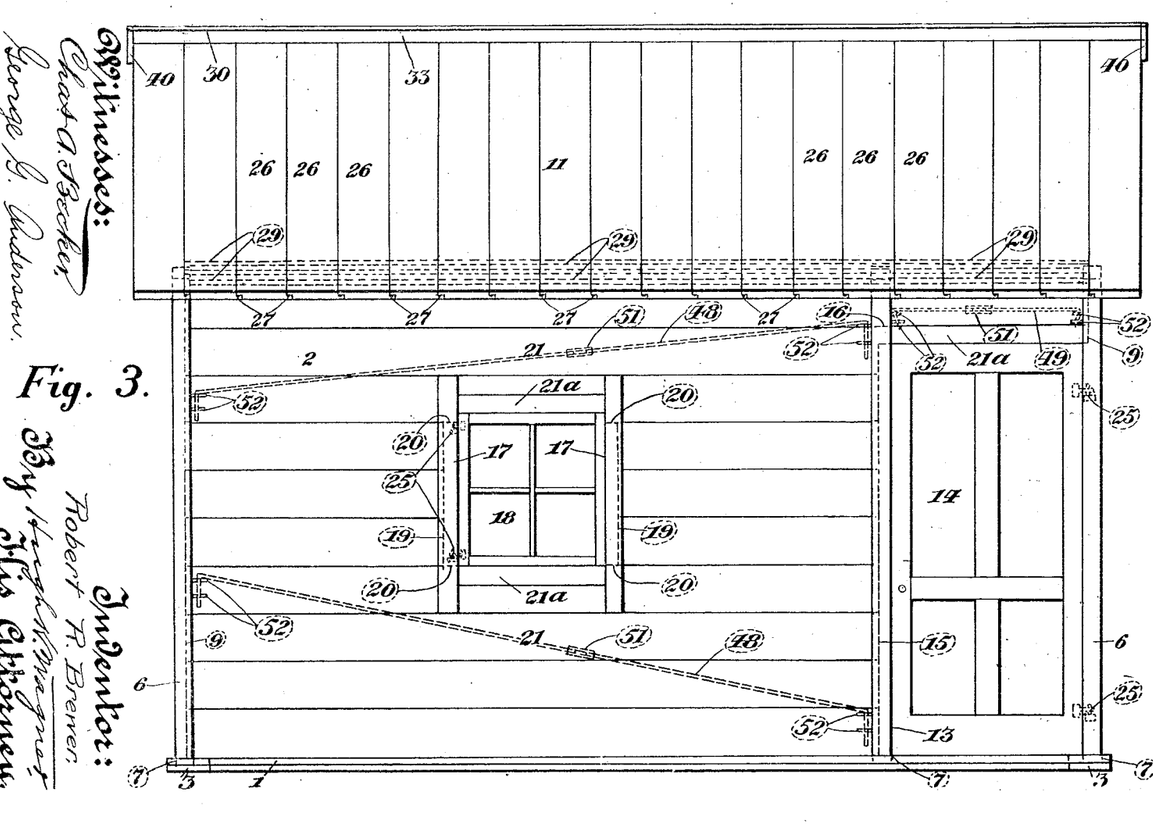

At each end of the building and preferably on the inside thereof a tie-rod 45 connects the tops of the corner posts 6. Each intermediate post of one side wall is connected to an opposite intermediate post of the other side wall by a similar tie-rod 45. The center post of each end wall is connected to each corner post of the same end wall by a plurality of tie-rods 46. When a door 14, alone, is located in a side wall or in a center wall as illustrated in Fig. 5, each post 13, which forms a side of the door-frame, is connected to a corner post 6 by the tie-rods 47. When a door 14 and a window 18 are located in the same side wall 2, as shown in Fig. 3, a corner post 6 and the post 13 are connected to each other by the tie-rods 48, and the top of said post 13 is connected to the other post 6 by a tie-rod 49. The center post 8 of each side wall is connected to each corner post 6 of the same wall by the tie-rod 50, as depicted in Fig. 2.

Figures 10, 11, 12:
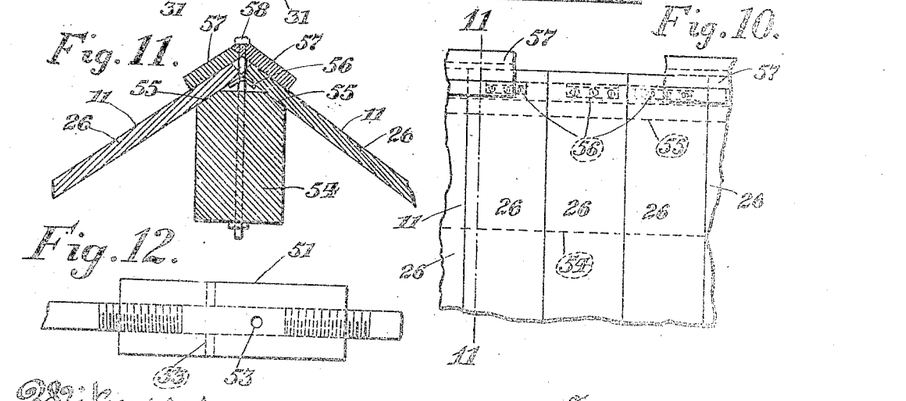
Fig. 10 is an elevation of a portion of the ridge, showing an alternative form of holding the roof-boards together.
Fig. 11 is a sectional view on the line 11—11, Fig. 10.
Fig. 12 is an elevation of a turn-buckle.

Each of the above-mentioned tie-rods 45, 46, 47, 48, 49, and 50 comprises a pair of rods which are connected by a turn-buckle 51, as shown in Fig. 12. Each end of said above-mentioned tie-rods is bent so as to fit into a pair of screw-eyes 52, which are attached to an upright. Each turn-buckle 51 is provided with a pair of apertures 53, which are preferably perpendicular to each other and extend transversely through said turn-buckle. A suitable tool or nail can be inserted into either of said apertures for the purpose of turning said turn-buckle, whereby the tension of said tie-rod can be regulated.

In the alternative form of ridge-pole, depicted in Figs. 10 and 11, a pole 54, which is provided with the beveled surfaces 55, extends the full length of the roof 11. Each roof-board 26 of one side of the roof is provided with a hinge 56, which is, also, attached to an opposite board 26 of the other side of the roof. Each pair of roof-boards 26 straddle the pole 54 and rest upon the beveled surfaces 55 of said pole and, also, fit against a pair of adjacent boards 26. The ridge of the roof is covered with a pair of boards 57, which are nailed together along a side edge of each. The boards 57 are fastened to the pole 54 by a bolt 58, or a plurality of such bolts.

The building is assembled as follows: The sills are all fitted together in the manner hereinabove described and each upright is set in its opening 7. Each of said uprights is then connected to another upright by a proper tie-rod, or tie-rods, which hold said uprights in position to erect the walls of the building. In erecting a side wall 2, depicted in Fig. 2, each board 21, which is located below a window 18, is inserted into a groove 9 in post 6 and into a groove 10 in post 8. Each side piece 17 of each window 18 is set in place adjacent an end of a pair of boards 21ª by sliding a slotted end 20 over the board 21 to which said pair of boards 21ª are attached. The short boards 21 on one side of a window 18 are inserted into a groove 19 in a side piece 17 and into groove 9 in a post 6, and the short boards 21 on the other side of said window are inserted into a groove 19 in a side piece 17 and into a groove 10 in post 8. Each board 21 extending across the top of a window 18 is inserted into a groove 9 and into a groove 10, and said board is, also, inserted in the slotted end 20 of the top of each side piece 17 so that the pair of boards 21ª, which are attached to said board 21, will fit between said side pieces 17 and form the top of the window frame. The remaining space above each of said last-mentioned boards 21 and between post 8 and a post 6 is filled to the level of the top of groove 10 with a board or boards 21. The top board of said side extends between the end posts 6 and is inserted into a groove 9 in each of said posts 6 and, also, passes through slot 12 in the top of post 8. All of the tie-rods 50 are then tightened by turning a turn-buckle 51 on each, whereby the uprights are caused to fit snugly against the ends of the boards 21 and said boards 21 are, also, held firmly in the grooves of said uprights. Each window 18 is then hung on its hinges 25.

In the side wall 2, as shown in Fig. 3, the boards are inserted into the groove 9 in post 6 and into groove 15 in post 18 which forms part of the door-frame. The board to which the pair of boards 21ª is attached over the door 14 extends between the corner post 6 of said wall and passes through slot 16 in the top of post 13 and is inserted into a groove 9 in each of said corner posts 6. The top board of said wall, also, passes through slot 16 and is inserted into said grooves 9. The tie-rods 48 and tie-rod 49 are then tightened.

Figure 4:
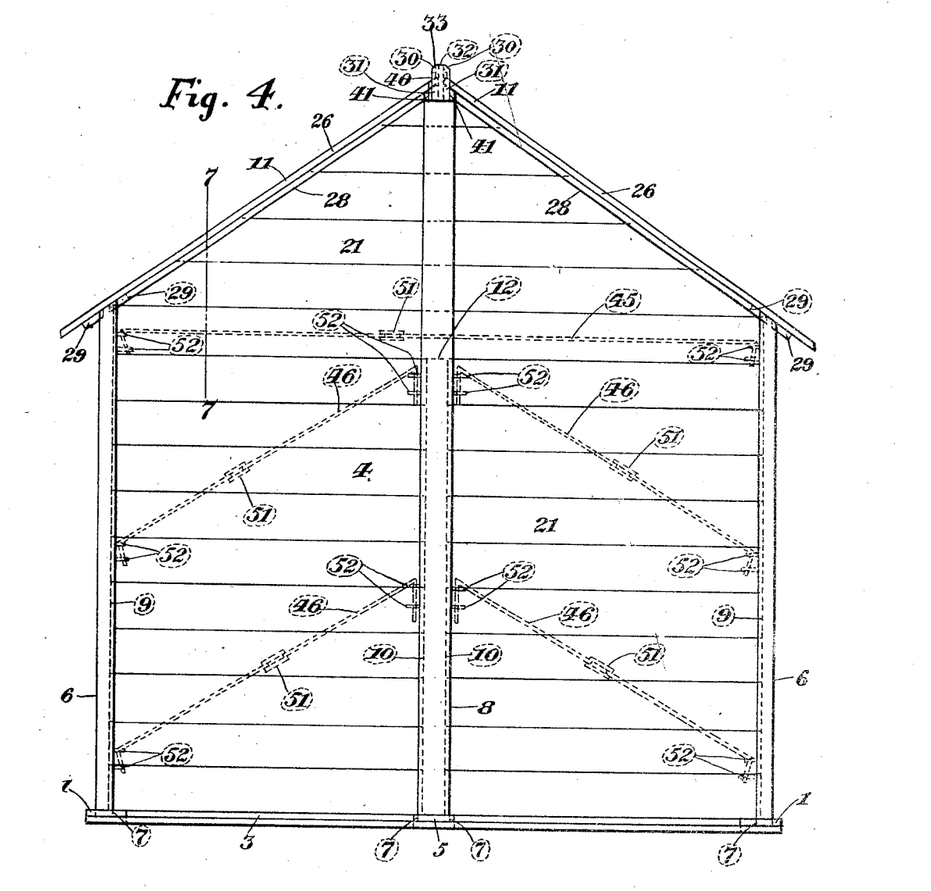
Figs. 4 and 5 are end elevations.

The boards 21 on each side of post 8 in an end wall 4, illustrated in Fig. 4, are inserted into groove 10 and into groove 9 and fill the space from the sill to the top of said groove 10. The remaining boards, which are above the top of grooves 10 and are inserted into grooves 9, pass through slot 12 in post 8. The boards 21, which abut the roof-boards 26, are inserted into said slot 12 in such manner that each end of each of said boards 21 will lie in a plane of the roof 11. The tie-rods 51 and the tie-rod 45 are then tightened.

When a door 14 is located in an end wall 4, as shown in Fig. 5, the boards 21 on each side of said door are inserted into a groove 15 in a post 13 and into a groove 9 in a post 6 and fill the space from the sill to the top of groove 15 on each side of said door. The board 21 to which a pair of boards 21ª is attached is then inserted into slots 16 in said post 13 and is, also, inserted into grooves 9. The remaining space above said door is filled to the top of grooves 9 with a board or boards 21, which, also, extend through slots 16. Each board 22 is attached to one of said boards 21 above door 14 by the bolts 23, and the remaining boards 21, which abut the roof-boards are inserted in place between said boards 22. The bolt 24 is then passed through the top end of each board 22, and the tie-rod 45 and tie-rods 47 tightened and the door is hung on its hinges 25. The ridge-pole 33 is next set in place in such manner that the top of a center post 8 in each end wall, or the top of boards 22 will be located between a pair of cleats 41. The top end of each roof-board 26 is inserted into a groove 34, and the bottom end of each roof-board is set on the top of a side wall so that the top of said side wall will be between a pair of cleats 29. The end boards of the roof are inserted into place and a chain 44 is laced through the screw-eyes 42 and through screw-eyes 43 on each side of the building and each chain is secured at its ends by any ordinary means.

I claim:

1. In a portable building, the combination of a roof comprising a ridge-pole having a pair of grooves, a plurality of roof-boards, each of said roof-boards being inserted into one of said grooves, each end roof-board being provided with a strip of wood, each intermediate roof-board being provided with a pair of cleats, a pair of side walls, a pair of end walls, said ridge-pole being supported by said end walls, said cleats on each intermediate roof-board being adapted to straddle the top of a side wall, a plurality of screw-eyes attached to one of said cleats on each roof-board, a plurality of screw-eyes attached to each side wall, a pair of chains, each of said chains being laced through all of said screw-eyes on a side of the building, and means for securing each end of said chains to the building.

2. In a portable building, the combination of a roof comprising a plurality of boards, each end of each of said boards being provided with a cleat, each of said cleats being provided with a screw-eye, a wall adapted to support an end of said boards, a plurality of screw-eyes attached to said wall and adjacent said first-mentioned screw-eyes, a chain laced through all of said screw-eyes, and means for securing each end of said chain to said wall.

3. A portable building including a plurality of walls, a roof supported from said walls and comprising a ridge-pole having a pair of grooves, a plurality of roof-boards adapted to fit into said grooves, each of said roof-boards having rabbeted edges, each of said roof-boards being provided with a pair of cleats and with screw-eyes, a plurality of screw-eyes secured to each wall supporting said roof and adjacent said cleats, a pair of chains, each of said chains being laced through adjacent screw-eyes on each side of said building, substantially as and for the purpose set forth.

4. In a portable building, a pair of uprights, a pair of members forming the sides of a window frame, each end of each of said members being slotted and the outer sides of said members being grooved between said slots thereof, boards arranged between the uprights, the boards adjacent said members extending into the slots thereof, short boards extending in said grooves of the members and secured to the uprights, and a pair of boards secured to and disposed on opposite sides of the boards at the top and bottom of the window.

5. In a portable building, a pair of uprights, a pair of members forming the sides of a window frame, each end of each of said members being slotted and the outer sides of said members being grooved between said slots thereof, boards arranged between the uprights, the boards adjacent said members extending into the slots thereof, short boards extending in said grooves of the members and secured to the uprights, the boards engaging in said slotted ends of the members which form the sides of a window frame acting as supports for said members.

6. In a portable house, end uprights, posts forming the sides of a door frame arranged in spaced relation to each other and to said end uprights, said posts having slotted upper ends and their outer sides grooved below the slotted upper ends, short boards extending in said grooves and connected to the uprights, a long board connected to the uprights and extending through the slotted ends of the posts, a pair of spaced vertical boards on opposite sides of and secured to said long board, a series of boards disposed in said space between the vertical boards, and a ridge pole resting on the vertical boards.

7. In a portable house, in combination with the side walls and the ridge pole, a plurality of roof boards secured at one end to the ridge pole, eye members carried by the opposite ends of the roof boards, and by the side walls, and a flexible element laced through the eye members to rigidly secure the roof boards in position.

8. In a portable house, a sill formed with openings at its corners and with other and similar openings intermediate its ends, uprights engaging in the corner openings and formed with inwardly facing grooves, a post at one end of the sill engaging in an intermediate opening, said post being formed with vertical side grooves and with a slotted upper end, boards which engage in the side grooves of the post and the grooves of the uprights, a board which extends through the slot of the post and seats in said grooves of the uprights, other boards which engage in the slotted end of the post, a horizontal tie rod connecting the uprights at the tops of the latter, and two pairs of diagonal tie rods arranged one pair on each side of the post and being connected at one end to the post and at their opposite ends to the uprights.

In testimony whereof I have affixed my signature in presence of two witnesses.

ROBERT R. BREWER.

Witnesses:
  GLADYS WALTON,
  GEORGE G. ANDERSON.